May 24, 1927.

P. E. PULVERMAN 1,629,887

PLUNGER FOR PRESSURE GAUGES OR SIMILAR ARTICLES

Filed Aug. 2, 1920

Inventor:
Philip E. Pulverman
by: [signature]
His Attorney

Patented May 24, 1927.

1,629,887

UNITED STATES PATENT OFFICE.

PHILIP E. PULVERMAN, OF CHARLESTON, WEST VIRGINIA, ASSIGNOR TO THE VISOMETER CORPORATION, OF NEW YORK, N. Y., A CORPORATION.

PLUNGER FOR PRESSURE GAUGES OR SIMILAR ARTICLES.

Application filed August 2, 1920. Serial No. 400,752.

This invention is designed to simplify the plungers which are used with pressure gauges carried by the valve stems on automobile tires. Such plungers usually are provided with a scale which indicates the tire pressure, the plunger moving under the influence of such pressure. The plunger when it carries the tire valve, as is commonly the case, is provided with a screw thread for securing the pump connection and it is necessary to lock the plunger against rotation in order to permit of the attachment of the pump connection and the placing of the cap on the stem. In the present invention the plunger is formed with a cylindrical tubular body and is covered with a sheet metal sleeve on which the scale is formed preferably by etching while the sheet is flat. The sheet is then rolled to cylindrical shape to form a thin split sleeve. The body is provided with shoulders and locking means and the split sleeve is sprung over a shoulder so that when it snaps into place on the body no further means of attachment is required.

The invention is illustrated in the accompanying drawings as follows:—

Figure 1:
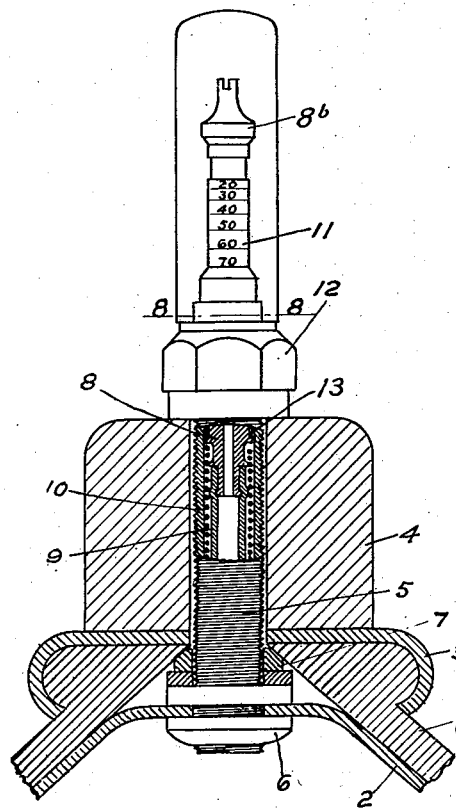

Fig. 1 shows a section of a portion of a tire, and wheel felloe with a pressure gauge in place.

Figures 2, 3:
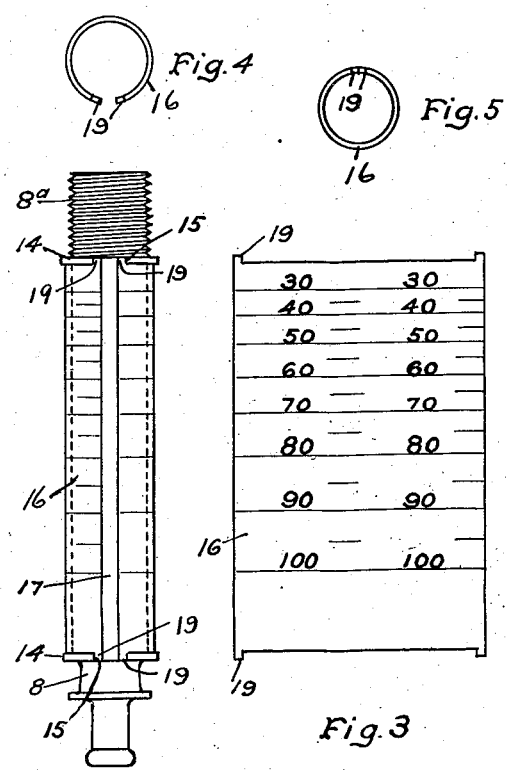

Fig. 2 an elevation of the plunger.

Fig. 3 an elevation of the plate from which the veneer is formed.

Fig. 4 an end view of the split sleeve as expanded by the body.

Fig. 5 an end view of the split sleeve as formed.

Figure 6:
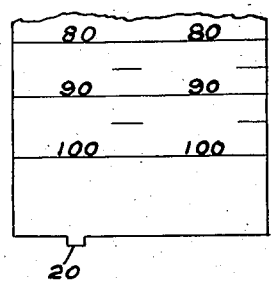

Fig. 6 an elevation of an alternative construction of split sleeve plate.

Figure 7:
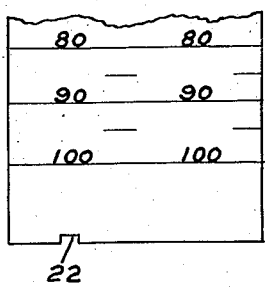

Fig. 7 an elevation of a portion of an alternative construction of split sleeve plate.

Figure 8:
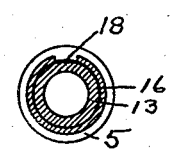

Fig. 8 a section on the line 8—8 in Fig. 1.

1 marks a tire, 2 a tire tube, 3 a wheel rim, 4 a felloe, 5 a valve tube which has a head 6 between which and a nut 7 the tube is clamped in the usual manner. The valve tube or stem 5 has its outer surface screw-threaded and a plunger 8 is slidably mounted within the tube. The plunger is hollow and carries the inflation valve (not shown) of the usual form and is in communication with the interior of the tire tube by means of a rubber tube 9. A spring 10 resists the outward movement of the plunger so that a scale 11 which may be arranged on the plunger will indicate the tire pressure. The outer end of the plunger is provided with a screw thread $8^a$ to which a pump connection may be secured for inflation and to which the usual cap $8^b$ is attached. A transparent glass cover or cap axially mounted on a nut 12 covers the exposed part of the plunger and is secured by means of the nut to the screw-threaded portion of the stem 5.

The plunger is provided with a cylindrical portion 13 at each end of which is a peripheral flange 14. Each flange is provided with a notch 15 and said notches are in alignment. A plate 16 has the scale 11 formed upon it preferably while the plate is in a flat condition. It is then coiled or bent to cylindrical shape having a less interior diameter than the portion 13 of the plunger taking a position as shown in Fig. 5. This split sleeve is then sprung over one of the flanges 14 and then moved axially until it snaps into place on the portion 13 between the flanges and is then locked against axial movement on the plunger by engagement with the flanges 14.

The plate of which the sleeve 16 is formed is of such width that when it is bent to form a cylinder the inside diameter of the same is less than the diameter of the portion 13 between the flanges 14. The sleeve is expanded transversely to increase its diameter whereby it may be placed over the portion 13 by an axial movement of the sleeve over the flange 14 at one end of the tube 5. When the sleeve has passed over the flange its diameter will contact to that of the diameter of the portion 13, and as the periphery of the sleeve is less than that of said portion, a gap between the longitudinal edges of the sleeve will result. When the sleeve is in proper position the gap will be in alinement with the notches 15 whereby a keyway 17 is formed and said keyway is adapted to be engaged by a key 18, formed in or carried by the tube 5, to prevent relative rotation of the tube and plunger.

In order to lock the sleeve against turning on the plunger I prefer to have an interlocking means between the plunger and the sleeve. In the preferred construction this is effected by means of the projections 19 which are arranged on the sleeve and which extend into the notches 15 at each side of the key-way 17, the latter being narrower than the notches. In this way not only is the metal sleeve locked against turning but the same is so braced as to prevent spreading of the edges forming the sides of the key-way 17 under strains. The metal sleeve may be formed with a projection 20 (as shown in Fig. 6) which may form the locking means with the shoulder 14 or it may be provided with a notch 22 as shown in Fig. 7 which may form a locking means with the shoulder 14. In these structures, however, the resiliency of the metal would have to be relied upon to prevent spreading and, I, therefore, prefer the construction shown in Figs. 2 and 3.

What I claim as new is:—

1. A pressure gauge plunger, comprising a cylindrical body portion, a split sleeve surrounding the body portion, and cooperative means carried by the sleeve and plunger for preventing relative movement of the parts.

2. A pressure gauge plunger, comprising a cylindrical body portion, a split sleeve surrounding the body portion, and means carried by the body portion and engaging the ends of the sleeve for preventing movement of the same relatively to the body portion.

3. A pressure gauge plunger, comprising a cylindrical body portion, a split sleeve surrounding the body portion, means carried by the body and engaging the ends of the sleeve for preventing axial movement of the same relatively to the body portion, and cooperative means carried by the body and sleeve for preventing rotation of the sleeve relatively to the body portion.

4. A pressure gauge plunger, comprising a cylindrical body portion, a split sleeve surrounding the body portion, a flange at each end of the body portion, the ends of said sleeve engaging the flanges to prevent longitudinal movement of the sleeve relatively to the body, and means carried by the sleeve and engaging the flanges for preventing rotation of the sleeve relatively to the body.

5. A pressure gauge plunger comprising a cylindrical body portion having peripheral flanges at the ends of the body portion; and a split sleeve substantially surrounding the body portion between the flanges, said flanges preventing movement of the sleeve longitudinally of the body.

6. A pressure gauge plunger comprising a cylindrical body portion having peripheral flanges at the ends of the body portion; and a resilient split sleeve substantially surrounding the body portion between the flanges, said flanges preventing longitudinal movement of the sleeve relatively to the body, the resilience of the sleeve permitting the assembly of the sleeve on the body portion by springing the sleeve over a flange.

7. A pressure gauge plunger comprising a cylindrical body portion having peripheral flanges at its ends; a split sleeve surrounding the body portion between the flanges, the flanges preventing longitudinal movement of the sleeve, the sleeve having its edges separated when in place on the body portion forming a key-way between said edges; and cooperative means carried by the sleeve and body for locking the sleeve against rotation relatively to the body portion.

8. A pressure gauge plunger comprising a cylindrical body portion having peripheral flanges at its ends; a split sleeve surrounding the body portion between the flanges, the flanges locking the sleeve against axial movement, the sleeve having its edges separated when in place on the body portion forming a key-way between said edges; and means for locking the sleeve against rotation relatively to the body portion, said means comprising interlocking lugs and notches carried by the sleeve and the body respectively.

9. A pressure gauge plunger comprising a cylindrical body portion having peripheral flanges at its ends; a split sleeve surrounding the body portion between the flanges, the flanges locking the sleeve against axial movement, said sleeve having its edges separated when in place on the body portion forming a key-way between said edges; and cooperative means carried by the body and sleeve for preventing deformation of said keyway due to spreading of the sleeve.

10. A pressure gauge plunger comprising a cylindrical body portion having peripheral flanges at its ends; a split sleeve surrounding the body portion between the flanges, the flanges locking the sleeve against axial movement, said sleeve having its edges separated when in place on the body portion forming a key-way between said edges; and means for locking the split sleeve against rotation relatively to the body portion, said means comprising interlocking devices between the sleeve and one of the flanges at each side of the key-way formed by the edges of the sleeve.

11. The combination with a tubular stem having an internal longitudinal key, of a plunger positioned within the stem, said plunger comprising a cylindrical body portion provided with peripheral flanges at its ends with notches therein, and a resilient split sleeve surrounding the body between the flanges and adapted to be sprung into place between the flanges, said sleeve having projections at its ends and at each of its edges, said projections extending into the notches in the flanges, the sleeve having the edges separated when in place on the body portion to form a key-way to receive the key of the stem.

12. A pressure gauge plunger comprising a cylindrical body portion with peripheral flanges at its ends with notches therein, and a resilient split sleeve surrounding the body between the flanges, and adapted to be sprung into place between the flanges, said sleeve having projections at its ends and at each of its edges, said projections extending into the notches in the flanges, the sleeve having the edges separated when in place on the body portion.

In testimony whereof I have hereunto set my hand.

PHILIP E. PULVERMAN.